(12) United States Patent
Tan et al.

(10) Patent No.: US 6,620,762 B2
(45) Date of Patent: Sep. 16, 2003

(54) EXHAUST GAS PURIFYING CATALYST

(75) Inventors: Isao Tan, Ikeda (JP); Mari Uenishi, Ikeda (JP); Hirohisa Tanaka, Ikeda (JP)

(73) Assignee: Daihatsu Motor Co., Ltd. (JP)

( * ) Notice: Subject to any disclaimer, the term of this patent is extended or adjusted under 35 U.S.C. 154(b) by 106 days.

(21) Appl. No.: 09/902,570

(22) Filed: Jul. 12, 2001

(65) Prior Publication Data

US 2002/0032124 A1 Mar. 14, 2002

(30) Foreign Application Priority Data

Jul. 18, 2000 (JP) .................................. 2000-216973

(51) Int. Cl.[7] ............................................... B01J 23/63
(52) U.S. Cl. ...................... 502/304; 502/303; 502/302
(58) Field of Search ................... 502/303, 302, 502/304, 325, 332, 328, 333, 334

(56) References Cited

U.S. PATENT DOCUMENTS

| | | | | |
|---|---|---|---|---|
| 4,753,915 A | * | 6/1988 | Vogt et al. ................... | 502/304 |
| 4,904,633 A | * | 2/1990 | Ohata et al. ................. | 502/304 |
| 4,927,799 A | * | 5/1990 | Matsumoto et al. ......... | 502/303 |
| 4,957,896 A | * | 9/1990 | Matsumoto et al. ......... | 502/304 |
| 5,039,647 A | * | 8/1991 | Ihara et al. .................. | 502/251 |
| 5,492,878 A | * | 2/1996 | Fujii et al. ................... | 502/304 |
| 5,677,258 A | * | 10/1997 | Kurokawa et al. .......... | 502/303 |
| 2001/0031699 A1 | * | 10/2001 | Matsumoto et al. ......... | 502/303 |

FOREIGN PATENT DOCUMENTS

| | | | | |
|---|---|---|---|---|
| EP | 0 988 890 A2 | | 3/2000 | ............ B01J/23/63 |
| EP | 1 004 347 A2 | | 5/2000 | ............ B01D/53/94 |
| EP | 01172139 A | * | 1/2002 | |
| JP | 62-071543 | | 4/1987 | ............ B01J/23/56 |
| JP | 401242149 A | * | 9/1989 | |
| JP | 04346836 A | * | 12/1992 | |
| JP | 07080311 A | * | 3/1995 | |
| JP | 10-182155 | * | 7/1997 | |
| JP | 2000140639 A | * | 5/2000 | |

OTHER PUBLICATIONS

Sawamura et al., "Preparation of Catlayst for Purifying Exhaust Gas", JP 361157347 A, Jul. 1986, JPO, english language abstract.*
European Search Report dated Nov. 5, 2001, Application No. EP 01 11 7277.
Patent Abstracts of Japan, 62–071543, Apr. 2, 1987.

* cited by examiner

*Primary Examiner*—Steven Bos
*Assistant Examiner*—Anthony Kuhra
(74) *Attorney, Agent, or Firm*—George T. Marcou; Kilpatrick Stockton LLP

(57) ABSTRACT

To provide an exhaust gas purifying catalyst that can develop good catalytic activity even in high-temperature endurance and also produce excellent low-temperature property, a coating layer having an outside layer and an inside layer is formed on a catalyst carrier, the outside layer being made to contain a noble metal previously supported on a heat-resisting oxide and a cerium complex oxide, and the inside layer being made to contain a heat-resisting oxide on which no noble metal is supported.

9 Claims, 2 Drawing Sheets

Endurance Test Condition (1 Cycle)

EXHAUST GAS PURIFYING CATALYST

BACKGROUND OF THE INVENTION

1. Field of the Invention

The present invention relates to an exhaust gas purifying catalyst for effectively purifying carbon monoxides (CO), hydrocarbons (HC) and nitrogen oxides (NOx) contained in exhaust gas from an automobile engine.

2. Description of Background Art

Exhaust gas purifying catalysts of three-way catalysts capable of simultaneously purifying carbon monoxides (CO), hydrocarbons (HC) and nitrogen oxides (NOx) contained in the exhaust gas use noble metals, such as Pt, Rh, and Pd as active material. In recent years, in the exhaust gas purifying catalyst, cerium oxide ($CeO_2$) has been receiving great interest in its capacity (oxygen storage capacity) of occluding or releasing oxygen in an atmosphere, and many attempts have been made to make the cerium oxide be contained in the three-way catalyst to adjust vapor atmosphere in oxidation reaction of CO and HC and in reduction reaction of NOx, to thereby produce improved purification efficiency. For example, various automobile exhaust gas purifying catalysts comprising the cerium oxide supported on alumina and the like, together with the noble metal, have been proposed.

However, when the cerium oxide is made to coexist with noble metal, dispersiveness of the noble metal is reduced and its low-temperature property (purifying property at starting under low temperature) is reduced. For avoidance of this problem, Japanese Laid-open (unexamined) Patent Publication No. Sho 62-71543 proposed that a coating layer of cerium oxide containing alumina is formed on the honeycomb catalyst carrier and a catalyst layer of noble metal is further formed on the coating layer, to produce the exhaust gas purifying catalyst of excellent in low-temperature property.

However, the exhaust gas purifying catalyst described by Japanese Laid-open (Unexamined) Patent Publication No. Sho 62-71543 is poor in heat-resisting property and hardly satisfactory in improvement of low-temperature property.

It is the object of the invention to provide an exhaust gas purifying catalyst that can develop good catalytic activity even in high-temperature endurance and also produce excellent low-temperature property.

SUMMARY OF THE INVENTION

The present invention provides a novel exhaust gas purifying catalyst comprising a coating layer supported on catalyst carrier, the coating layer comprising an outside layer formed on a front side thereof and an inside layer formed on an inner side of the outside layer, the outside layer comprising a noble metal previously supported on a heat-resisting oxide and a cerium complex oxide, the inside layer comprising a heat-resisting oxide on which no noble metal is supported.

This exhaust gas purifying catalyst of the present invention provides excellent low-temperature activity and also develops good catalytic activity even in high-temperature endurance. Accordingly, it can suitably be used for the automobile exhaust gas purifying catalyst.

It is preferable that the heat-resisting oxide supporting the noble metal thereon in the outside layer comprises at least one material selected from the group consisting of cerium complex oxide, zirconium complex oxide and alumina, and the heat-resisting oxide of the inside layer comprises at least one material selected from the group consisting of cerium complex oxide, zirconium complex oxide and alumina.

It is preferable that the cerium complex oxide comprises cerium and zirconium in the proportion of a cerium content being more than a zirconium content, and the zirconium complex oxide comprises zirconium and cerium in the proportion of a zirconium content being more than a cerium content.

Also, it is preferable that the cerium complex oxide is the heat-resisting oxide expressed by the general formula (1) given below:

$$Ce_{1-(x+y)}Zr_xM_yO_{2-z} \tag{1}$$

(In the formula, M represents alkali earth metal or rare earth metal, z represents oxygen vacancy, x represents a proportion of atom of 0.20–0.70, y represents a proportion of atom of 0–0.20, and 1–(x+y) represents a proportion of atom of 0.10–0.80), and the zirconium complex oxide is the heat-resisting oxide expressed by the general formula (2) given below:

$$Zr_{1-(a+b)}Ce_aN_bO_{2-c} \tag{2}$$

(In the formula, N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90).

It is preferable that the alkali earth metal represented by M in the general formula (1) and the alkali earth metal represented by N in the general formula (2) comprises at least one material selected from the group consisting of Mg, Ca, Sr and Ba, and the rare earth metal represented by M in the general formula (1) and the rare earth metal represented by N in the general formula (2) comprises at least one material selected from the group consisting of Y, Sc, La, Pr and Nd.

Preferably, the noble metal comprises at least one material selected from the group consisting of Pt, Rh and Pd. Also, it is preferable that the outside layer and/or the inside layer further comprises hydrosulfate, carbonate, nitrate and/or acetate of Ba, Ca, Sc, Mg and La.

It is preferable that both of the outside layer and the inside layer comprise alumina.

Further, it is preferable that a catalyst layer comprising a noble metal is further formed on the coating layer at an exhaust gas inflow side of the catalyst carrier.

The constitution that the catalyst layer comprising a noble metal is further formed on the coating layer at an exhaust gas inflow side of the catalyst carrier can allow the carbon monoxides (CO), hydrocarbons (HC) and nitrogen oxides (NOx) contained in the exhaust gas to be purified in the vicinity of the exhaust gas inlet, so that the entire catalyst can be prevented from being deteriorated to provide the purification with efficiency.

Further, it is preferable that the noble metal of the catalyst layer comprises at least one material selected from the group consisting of Pt, Rh and Pd.

DETAILED DESCRIPTION OF PREFERRED EMBODIMENTS

Figure 1:
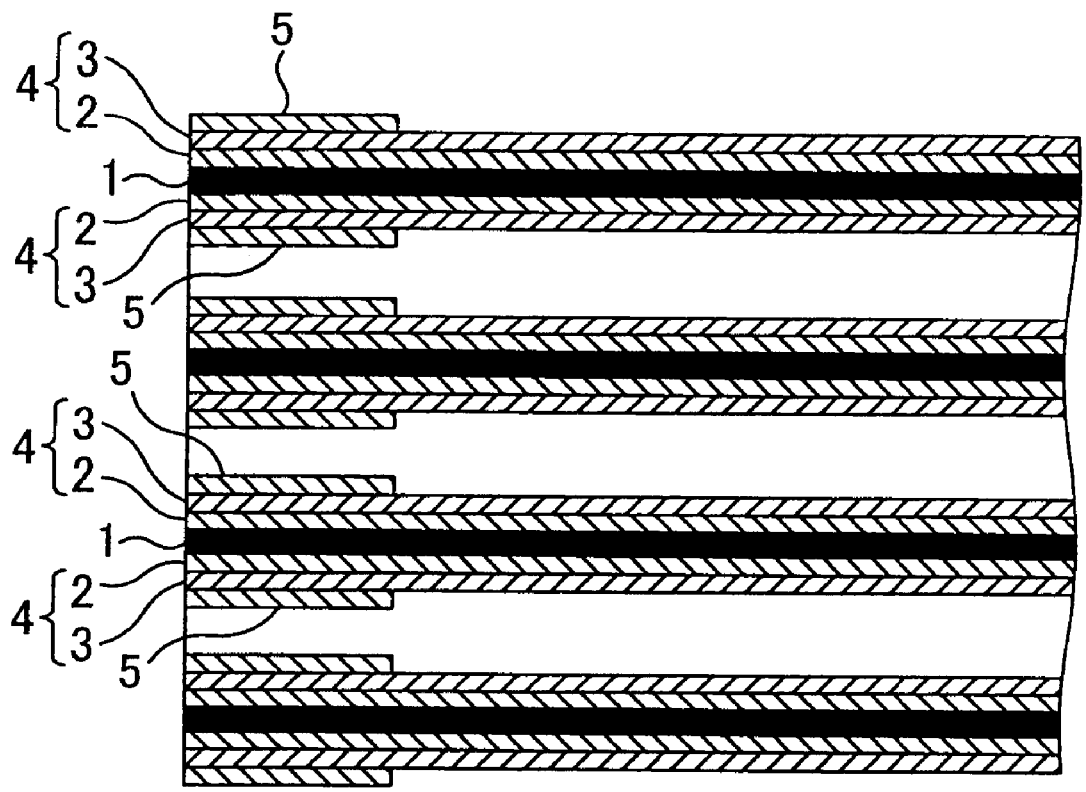
FIG. 1 is a sectional view of a schematically illustrated exhaust gas purifying catalyst of a preferred embodiment according to the present invention.

An exhaust gas purifying catalyst of the present invention comprises a coating layer supported on a catalyst carrier, an outside layer formed on the coating layer at a front side thereof, and an inside layer formed on the outside layer at an inner side thereof Catalyst carrier used is not limited to any particular catalyst carrier. Known catalyst carriers, such as honeycomb monolithic carrier comprising cordierite and the like, may be used.

The outside layer comprises a noble metal previously supported on a heat-resisting oxide, and a cerium complex oxide.

Noble metals previously supported on the heat-resisting oxide include, for example, elements of a platinum group, such as Pt (platinum), Rh (rhodium), Pd (palladium), Ru (ruthenium), Os (osmium), and Ir (iridium). Pt, Rh and Pd can be cited as the preferable noble metal.

The heat-resisting oxide supporting the noble metal thereon is preferably selected from the group consisting of cerium complex oxide, zirconium complex oxide and alumina.

It is preferable that the cerium complex oxide comprises cerium and zirconium in the proportion of a cerium content being more than a zirconium content, and the cerium complex oxide is the heat-resisting oxide expressed by the following general formula (1):

$$Ce_{1-(x+y)}Zr_xM_yO_{2-z} \tag{1}$$

(In the formula, M represents alkali earth metal or rare earth metal, z represents oxygen vacancy, x represents a proportion of atom of 0.20–0.70, y represents a proportion of atom of 0–0.20, and 1–(x+y) represents a proportion of atom of 0.10–0.80).

The alkali earth metals represented by M include, for example, Be (beryllium), Mg (magnesium), Ca (calcium), Sr (strontium), Ba (barium), and Ra (radium). Mg, Ca, Sr and Ba can be cited as the preferable alkali earth metal. The rare earth metals represented by M include, for example, Y (yttrium), Sc (scandium), La (lanthanum), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium). Y, Sc, La, Pr and Nd can be cited as the preferable rare earth metal. These alkali earth metals or the rare earth metals may be used in single or in combination of two or more.

The proportion of atom of M represented by y is in the range of 0–0.20, which means that no M is contained as the component of heat-resisting oxide or not more than 0.20 of M is contained, if any.

The proportion of atom of Zr (zirconium) represented by x is in the range of 0.20–0.70. Deterioration of the heat resisting property may be caused when the proportion of atom of Zr is less than 0.20. On the other hand, deterioration of the oxygen storage capacity may be caused due to the lack of Ce (cerium) when the proportion of atom of Zr is more than 0.70.

Consequently, the proportion of atom of Ce represented by 1–(x+y) is preferably in the range of 0.10 to 0.80. Further preferably, the proportion of atom of Ce is in the range of 0.35–0.70.

Z represents oxygen vacancy, which means a proportion of vacancy formed in a fluorite crystal lattice usually formed via the oxides of Ce, Zr and M.

This cerium complex oxide can be produced by a known method. To cite an instance, powder of cerium oxide is formed into slurry by adding water thereto, first. Then, an aqueous solution in which zirconium salt and alkali earth metal salt and/or rare earth metal salt are mixed at a prescribed stoichiometric ratio is added to the slurry and fully stirred. Then, the mixture is oxidized.

Preferably, the powder of cerium oxide is large in specific surface area, for providing an increased oxygen storage capacity, though a commercially available power of cerium oxide can be used. Preferably, the powder has particle size of not more than 0.1 $\mu$m. The slurry is formed by adding about 10–50 parts by weight of water to 1 part by weight of powder of cerium oxide.

Salts of the zirconium salt and alkali earth metal salt and/or rare earth metal salt include, for example, inorganic salts, such as hydrosulfate, nitrate, hydrochloride and phosphate, and organic salts, such as acetate and oxalate. Nitrate can be cited as the preferable one. The zirconium salt and the alkali earth metal salt and/or the rare earth metal salt are dissolved in water in a proportion of 1 part by weight of each to 0.1–10 parts by weight of water such that they come to be within the range of the above-mentioned specific proportion of atom at the prescribed stoichiometric ratio, to thereby produce mixed solution.

After the mixed solution is added to the slurry mentioned above and fully mixed by stirring, the mixture is oxidized. The oxidization process can be performed as follows. First, the mixture is dried under reduced pressure by use of a vacuum dryer, preferably at about 50–200° C. for about 1–48 hours, to thereby produce the dried material. Then, the dried material is baked at about 350–1,000° C., or preferably about 400–700° C., for about 1–12 hours, or preferably about 2–4 hours. Preferably, in the baking procedure, at least a part of the heat-resisting oxide is allowed to turn into a composite oxide and/or a solid solution, to improve the heat-resisting property of the hear-resisting oxide. Desirable baking conditions for forming the composite oxide and/or the solid solution are properly determined, depending on the composition of the heat-resisting oxide and the proportion thereof.

The cerium complex oxide can be obtained in the following method as well. First, a salt solution containing cerium, zirconium and alkali earth metal and/or rare earth metal is prepared in such a manner as to establish a prescribed stoichiometric ratio. Then, an aqueous alkaline solution is added in the solution, to coprecipitate the salts including cerium, zirconium and alkali earth metal and/or rare earth metal. Then, the coprecipitated material is oxidized. In this method, the salts illustrated above can be cited as the salts used. The aqueous alkaline solutions that can properly be used include, for example, known buffer, in addition to aqueous solution of salts of alkali metals such as sodium and potassium, and ammonia. Preferably, the aqueous alkaline solution is so prepared that after the addition of the aqueous alkali solution, the solution can have a pH of about 8–11. The oxidization process identical to that mentioned above can be taken after the coprecipitated material is filtrated and washed.

Further, the cerium complex oxide can be obtained in the following method. First, a mixed alkoxide solution including cerium, zirconium and alkali earth metal and/or rare earth metal is prepared in such a manner as to establish a prescribed stoichiometric ratio. Then, deionized water is added in the mixed alkoxide solution to cause coprecipitation or hydrolysis. Then, the coprecipitated material or the hydrolyzed product is oxidized. In this method, the mixed alkoxide solution can be prepared by mixing the alcoholates of cerium, zirconium and alkali earth metal and/or rare earth metal in an organic solvent such as toluene and xylene. The alkoxides to form the alcoholates include methoxide, ethoxide, propoxide, butoxide and alkoxyalkolate thereof such as ethoxyethylate or methoxypropylate. The oxidization process identical to that mentioned above can be taken after the coprecipitated material or the hydrolyzed product is filtrated and washed.

It is preferable that the zirconium complex oxide comprises zirconium and cerium in the proportion of a zirconium content being more than a cerium content, and the zirconium complex oxide is the heat-resisting oxide expressed by the following general formula (2):

$$Zr_{1-(a+b)}Ce_aN_bO_{2-c} \qquad (2)$$

(In the formula, N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90).

The alkali earth metals or rare earth metals represented by N include the same as those mentioned above. Mg, Ca, Sr and Ba can be cited as the preferable alkali earth metal. Y, Sc, La, Pr and Nd can be cited as the preferable rare earth metal. These alkali earth metals or the rare earth metals may be used in single or in combination of two or more.

The proportion of atom of N represented by b is in the range of 0–0.20, which means that no N is contained as the component of heat-resisting oxide or not more than 0.20 of N is contained, if any. The specific surface area may reduce when the proportion exceeds 0.20.

The proportion of atom of Ce represented by a is in the range of 0.10–0.35. The specific surface area may reduce when the proportion of atom of Ce is less than 0.10.

Consequently, the proportion of atom of Zr represented by 1–(a+b) is in the range of 0.45 to 0.90. When this range is not fulfilled, an intended specific surface area and an intended heat resisting property may not be provided. Further preferably, the proportion of atom of Zr is in the range of 0.65–0.90.

c represents oxygen vacancy, which means a proportion of vacancy formed in a fluorite crystal lattice usually formed via the oxides of Zr, Ce and N.

This zirconium complex oxide can be obtained in a known method using the same process as that mentioned above.

The aluminas that may be used include a commercially available alumina, typically γ-alumina.

It is preferable that the noble metal is supported on the heat-resisting oxide of any of the cerium complex oxide, the zirconium complex oxide and the alumina. The method of allowing the noble metal to be supported on the heat-resisting oxide is not limited to any particular method. Any of the existing methods may be used. To cite an instance, after a salt solution containing the noble metals is prepared, the heat-resisting oxide is impregnated into the salts contained solution and then is baked.

In this method, the solution of salts illustrated above may be used for the salt contained solution. In practice, aqueous nitrate solution, dinitrodiammine nitric acid solution, aqueous chloride salt solution and the like are used. To be more specific, platinate solutions that may preferably be used include, for example, dinitrodiammine platinum nitrate solution, chloroplatinic solution and quadrivalent platinum ammine solution. Palladic salt solutions that may preferably be used include, for example, palladium nitrate solution, dinitrodiammine palladium nitrate solution and quadrivalent palladium ammine nitrate solution. Rhodium salt solutions that may preferably be used include, for example, rhodium nitrate solution and rhodium chloride solution. Preferably, after the noble metal is impregnated with the heat-resisting oxide, it is dried at about 50–200° C. for about 1–48 hours and further is baked at about 350–1,000° C. for about 1–12 hours.

Another method may be adopted for allowing the noble metal to be supported on the heat-resisting oxide. To cite an instance, when a salt solution containing cerium, zirconium and alkali earth metal and/or rare earth metal or a mixed alkoxide solution is coprecipitated or hydrolyzed in the producing process of the heat-resisting oxide, a salt solution of noble metals is added to cause the salts of the noble metal to be coprecipitated together with the components of the heat-resisting oxides and then the coprecipitated material is oxidized.

The outside layer comprises the noble metal supported heat-resisting oxide thus produced and the cerium complex oxide. Preferable composition forms of the outside layer include, for example, the one that is formed merely by the noble metal supported cerium complex oxide, in the case where the noble metal is supported on the cerium complex oxide. Any of noble metal supported zirconium complex oxide, noble metal supported alumina, cerium complex oxide, zirconium complex oxide and alumina may further be mixed in it. In the case where the noble metal is supported on the zirconium complex oxide and/or the alumina, the cerium complex oxide can be mixed in the noble metal supported zirconium complex oxide and/or the noble metal supported alumina. Further, either of the zirconium complex oxide and the alumina may be mixed in them.

The inside layer comprises a heat-resisting oxide in which no noble metal is supported. Preferably, the heat-resisting oxide forming the inside layer is formed of any of the cerium complex oxide, the zirconium complex oxide and the alumina.

Preferably, the cerium complex oxide is contained in the inside layer as well, in order to enhance the total oxygen storage capacity of the catalyst. Preferably, the zirconium complex oxide is contained in the outside layer, in order to provide the heat resisting property to the noble metal. Further, it is particularly preferable that the alumina is contained in both of the inside layer and the outside layer, in order to produce improved heat-resisting property and improved adsorbing property of the exhaust gas.

Thus, preferable compositions of the outside layer include the composite form in which the outside layer comprises the cerium complex oxide and, as required, the zirconium complex oxide and the alumina, and the noble metal is supported on at least one material of them. In this composite form of the outside layer, an example of a preferable proportion of the heat-resisting oxides contained is in the proportion of 50–150 g of cerium complex oxide, 20–80 g of zirconium complex oxide and 50–180 g of alumina per liter of catalyst carrier.

Further, it is preferable in the outside layer that the proportion of the noble metal supported is, for example, in a proportion of 0.1–15 g, or preferably 0.5–10 g, of noble metal per liter of catalyst carrier.

Preferable compositions of the inside layer include the composite form in which the inside layer comprises the cerium complex oxide and alumina, as required. In this composite form of the inside layer, an example of a preferable proportion of the heat-resisting oxides contained is in a proportion of 20–80 g of cerium complex oxide and 20–90 g of alumina per liter of catalyst carrier.

Now, reference is given to the method of forming a coating layer comprising these outside layer and inside layer on the catalyst carrier.

The inside layer can be formed in the following process. For example, after the heat-resisting oxides are formed into slurry by adding water thereto, the slurry is mixed and coated on the catalyst carrier. Then, the coated slurry is dried at about 50–200° C. for about 1–48 hours and further baked at about 350–1,000° C. for about 1–12 hours.

The outside layer can be formed in the following process. After the noble-metal-supported heat-resisting oxides and the heat-resisting oxides are formed into slurry by adding water thereto, the slurry is mixed and coated on the inside layer. Then, the coated slurry is dried at about 50–200° C. for about 1–48 hours and further baked at about 350–1,000° C. for about 1–12 hours.

The proportion of the outside layer and the inside layer is selectively determined, depending on intended purposes and applications.

The coating layer comprising the outside layer and the inside layer is formed on the catalyst carrier in this manner, whereby the exhaust gas purifying catalyst of the present invention is produced. The exhaust gas purifying catalyst of the present invention thus produced produces excellent low-temperature activity and develops good catalytic activity even in high-temperature endurance. Thus, the exhaust gas purifying catalyst of the present invention can suitably be used as the automobile exhaust gas purifying catalyst.

It is preferable that the outside layer and/or the inside layer in the exhaust gas purifying catalyst of the present invention further comprises hydrosulfate, carbonate, nitrate and/or acetate of Ba, Ca, Sc, Mg and La. When these hydrosulfate, carbonate, nitrate and/or acetate are contained in the outside layer and/or the inside layer, the catalyst is prevented from being poisoned, for example, by the hydrocarbon (HC) of Pd, so that the catalytic activity is prevented from being deteriorated. The proportion in which the hydrosulfate, carbonate, nitrate and/or acetate are contained is properly selected, depending on the intended purposes and applications.

The outside layer and/or the inside layer containing the hydrosulfate, carbonate, nitrate and/or acetate can be formed in the following process. The inside layer can be formed by mixing the hydrosulfate, carbonate, nitrate and/or acetate in the slurry of the heat-resisting oxides mentioned above. In addition, the outside layer can be formed by mixing the hydrosulfate, carbonate, nitrate and/or acetate in the slurry of the noble metal supported heat-resisting oxides mentioned above. When Pd of the noble metal is supported on the heat-resisting oxide, the mixture of the hydrosulfate, carbonate, nitrate and/or acetate can produce further satisfactory effects.

Further, in the exhaust gas purifying catalyst of the present invention, it is preferable that a catalyst layer comprising a noble metal is formed on the coating layer at an exhaust gas inflow side of the catalyst carrier. The noble metals forming the catalyst layer include the same noble metals as those mentioned above. Pt, Rh and Pd can preferably be cited. The catalyst layer can be formed in the process that a front end portion of the catalyst carrier at the exhaust gas inflow side thereof on which the coating layer is formed is immerged into and impregnated into the noble metal contained salt solution and then is dried and baked in the same way as in the above. Preferably, the catalyst carrier is immerged into the salt solution to within about 5–40mm thereof, or preferably within about 20–30 mm thereof, from the front end thereof on the exhaust gas inflow side of the catalyst carrier, so that the noble metal is supported thereon at a concentration of 3–20 g/l, or preferably 5–10 g/l, per liter of catalyst carrier.

The catalyst layer thus formed can allow the carbon monoxides (CO), hydrocarbons (HC) and nitrogen oxides (NOx) contained in the exhaust gas to be purified in the vicinity of the exhaust gas inlet, so that the entire catalyst can be prevented from being deteriorated to provide the purification with efficiency.

The exhaust gas purifying catalyst of the present invention mentioned above can schematically be depicted as shown in FIG. 1, for example. In FIG. 1, the catalyst carriers 1 are presented in the form of the honeycomb monolithic carrier of a generally cylindrical configuration. The coating layers 4, each having the inside layer 2 and the outside layer 3, are formed on the respective cells and outside surfaces thereof. Further, the catalyst layers 5 comprising the noble metals are formed on the coating layers 4 on the exhaust gas inflow side of the catalyst carriers 1.

While in the embodiment illustrated above, the coating layers of the exhaust gas purifying catalyst are each formed into the two-layer structure comprising the inside layer and the outside layer, as long as the each coating layer includes the inside layer and the outside layer, the coating layer may be formed into a multilayer structure such as a three-layer or more structure.

EXAMPLES

In the following, the present invention will be described further specifically with reference to Examples and Comparative Examples. The present invention is not in any manner limited to the illustrated Examples.

Preparation of Composite Ceric Oxide A 0.1 mol of cerium methoxypropylate, 0.09 mol of zirconium methoxypropylate and 0.01 mol of yttrium methoxypropylate were added to 200 ml of toluene and stirred for dissolution, whereby a mixed alcoxide solution was prepared. Then, 80 ml of deionized water was dropped into the mixed alcoxide solution to hydrolyze the alcoxide. Then, the toluene and the deionized water were distilled off and evaporated for dryness from the hydrolyzed solution to produce the precursor of $Ce_{0.50}Zr_{0.45}Y_{0.50}O_{1.97}$. This was dried through circulation drying at 60° C. for 24 hours and then was baked at 450° C. for 3 hours in an electric furnace, to thereby produce powder of cerium complex oxide A having the composition of $Ce_{0.50}Zr_{0.45}Y_{0.50}O_{1.97}$.

Preparation of Heat-resisting Oxides B–H

In accordance with the same method as in the preparation of cerium complex oxide A, powder of heat-resisting oxides B–H having the following compositions were produced.
Cerium complex oxide B: $Ce_{0.48}Zr_{0.45}Y_{0.07}O_{1.96}$
Cerium complex oxide C: $Ce_{0.60}Zr_{0.32}Y_{0.08}O_{1.96}$
Zirconium complex oxide D: $Zr_{0.80}Ce_{0.16}La_{0.04}O_{1.98}$
Zirconium complex oxide E: $Zr_{0.78}Ce_{0.16}La_{0.02}Nd_{0.04}O_{1.97}$
Zirconium complex oxide F: $Zr_{0.80}Ce_{0.16}La_{0.02}Nd_{0.02}O_{1.97}$
Cerium-zirconium complex oxide G: $Ce_{0.50}Zr_{0.50}O_{2.00}$
Cerium complex oxide H: $Ce_{0.80}Zr_{0.20}O_{2.00}$

Example 1

Inside Layer

Powder of cerium complex oxide A and powder of $Al_2O_3$ were mixed and pulverized in a ball mill. Distilled water was added thereto to prepare the slurry. The slurry was allowed to adhere to inner surfaces of the cells of the monolithic carriers (105.3 mm in diameter, 123 mm in length, 1.08 L in capacity, 4 mill., 60 cell type, the same applies to the following). After having been dried, they were baked at 600° C. for 3 hours to thereby form the inside layers. It should be noted that the inside layers were formed to establish the proportion of 35 g of cerium complex oxide A and 50 g of $Al_2O_3$ per liter of monolithic carrier.

Outside Layer

First, dinitrodiammine platinum nitrate solution was impregnated with powder of cerium complex oxide A. After having been dried, this was baked at 600° C. for 3 hours in the electric furnace, so that Pt was supported on the cerium complex oxide A. Further, the Pt supported cerium complex oxide A was impregnated with rhodium nitrate solution Then, after having been dried, this was baked at 600° C. for 3 hours in the electric furnace to prepare powder of Pt—Rh supported cerium complex oxide A.

Then, dinitrodiammine platinum nitrate solution was impregnated with powder of zirconium complex oxide E. After having been dried, this was baked at 600° C. for 3 hours in the electric furnace, so that Pt was supported on the zirconium complex oxide E. Further, the Pt supported zirconium complex oxide E was impregnated with rhodium nitrate solution. Then, after having been dried, this was baked at 600° C. for 3 hours in the electric furnace to prepare powder of Pt—Rh supported zirconium complex oxide E.

Then, the powder of Pt—Rh supported cerium complex oxide A, the powder of $Al_2O_3$ and the powder of Pt—Rh supported zirconium complex oxide E were mixed and pulverized in the ball mill. Distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 50 g of Pt—Rh supported cerium complex oxide A (Pt supporting quantity: 0.65 g, Rh supporting quantity: 0.25 g), 55 g of $Al_2O_3$ and 50 g of Pt—Rh supported zirconium complex oxide E (Pt supporting quantity: 0.65 g, Rh supporting quantity: 0.75 g) per liter of monolithic carriers.

Catalyst Layer

Further, the monolithic carriers having the coating layers thus formed were immerged into the palladium nitrate solution to within about 20 mm thereof from the front ends thereof on the exhaust gas inflow side of the monolithic carriers. After having been dried, they were baked at 600° C. for 3 hours to thereby produce the catalyst layers of Pd. The catalyst layer was 5 g per liter of monolithic carrier.

Example 2

Inside Layer

Powder of cerium complex oxide A, powder of $Al_2O_3$ and powder of $BaSO_4$ were mixed and pulverized in the ball mill. Distilled water was added thereto to prepare the slurry. The slurry was allowed to adhere to inner surfaces of the cells of the monolithic carriers. After having been dried, they were baked at 600° C. for 3 hours to thereby form the inside layers. It should be noted that the inside layers were formed to establish the proportion of 40 g of cerium complex oxide A, 70 g of $Al_2O_3$ and 20 g of $BaSO_4$ per liter of monolithic carrier.

Outside Layer

First, dinitrodiammine platinum nitrate solution was impregnated with powder of cerium complex oxide B. After having been dried, this was baked at 600° C. for 3 hours in the electric furnace to prepare powder of Pt supported cerium complex oxide B.

Then, rhodium nitrate solution was impregnated with powder of zirconium complex oxide D. After having been dried, this was baked at 600° C. for 3 hours in the electric furnace to prepare powder of Rh supported zirconium complex oxide D.

Then, the powder of Pt supported cerium complex oxide B, the powder of Rh supported zirconium complex oxide D and the powder of $Al_2O_3$ were mixed and pulverized in the ball mill. Distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 70 g of Pt supported cerium complex oxide B (Pt supporting quantity: 1.00 g), 20 g of Rh supported zirconium complex oxide D (Rh supporting quantity: 1.00 g) and 50 g of $Al_2O_3$ per liter of monolithic carrier.

Catalyst Layer

Further, the monolithic carriers having the coating layers thus formed were immerged into the dinitrodiammine platinum nitrate solution to within about 20 mm thereof from the front ends thereof on the exhaust gas inflow side of the monolithic carriers. After having been dried, they were baked at 600° C. for 3 hours to thereby form the catalyst layers of Pt. The catalyst layer was 5 g per liter of monolithic carrier.

Example 3

Inside Layer

Powder of $Al_2O_3$ was mixed and pulverized in the ball mill. Distilled water was added thereto to prepare the slurry. The slurry was allowed to adhere to inner surfaces of the cells of the monolithic carriers. After having been dried, they were baked at 600° C. for 3 hours to thereby form the inside layers. It should be noted that the inside layers were formed to establish the proportion of 70 g of $Al_2O_3$ per liter of monolithic carrier.

Outside Layer

First, dinitrodiammine platinum nitrate solution was impregnated with powder of alumina. After having been dried, this was baked at 600° C. for 3 hours in the electric furnace, so that Pt was supported on the alumina. Further, the Pt supported alumina was impregnated with rhodium nitrate solution. Then, after having been dried, this was baked at 600° C. for 3 hours in the electric furnace to prepare powder of Pt—Rh supported alumina.

Then, the powder of Pt—Rh supported alumina and the powder of cerium complex oxide C were mixed and pulverized in the ball mill. Distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 65 g of Pt—Rh supported alumina (Pt supporting quantity: 1.30 g and Rh supporting quantity: 0.30 g) and 80 g of cerium complex oxide C per liter of monolithic carrier.

Catalyst Layer

Further, the monolithic carriers having the coating layers thus formed were immerged into the rhodium nitrate solution to within about 20 mm thereof from the front ends thereof on the exhaust gas inflow side of the monolithic carriers. After having been dried, they were baked at 600° C. for 3 hours to thereby form the catalyst layers of Rh. The catalyst layer was 5 g per liter of monolithic carrier.

Example 4

Inside Layer

Powder of cerium complex oxide A and powder of $Al_2O_3$ were mixed and pulverized in the ball mill. Distilled water was added thereto to prepare the slurry. The slurry was allowed to adhere to inner surfaces of the cells of the monolithic carriers. After having been dried, they were baked at 600° C. for 3 hours to thereby form the inside layers. It should be noted that the inside layers were formed to establish the proportion of 30 g of cerium complex oxide A and 30 g of $Al_2O_3$ per liter of monolithic carrier.

Outside Layer

First, dinitrodiammine platinum nitrate solution was impregnated with powder of cerium complex oxide A. After having been dried, this was baked at 600° C. for 3 hours in the electric furnace to prepare the powder of Pt supported cerium complex oxide A.

Then, dinitrodiammine platinum nitrate solution was impregnated with powder of zirconium complex oxide F. After having been dried, this was baked at 600° C. for 3 hours in the electric furnace, so that Pt was supported on the zirconium complex oxide F. Further, the Pt supported zirconium complex oxide F was impregnated with rhodium nitrate solution. Then, after having been dried, this was baked at 600° C. for 3 hours in the electric furnace to prepare powder of Pt—Rh supported zirconium complex oxide F.

Then, the powder of Pt supported cerium complex oxide A, the powder of Pt—Rh supported zirconium complex oxide F and the powder of $Al_2O_3$ were mixed and pulverized in the ball mill. Distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 40 g of Pt supported cerium complex oxide A (Pt supporting quantity: 0.65 g), 40 g of Pt—Rh supported zirconium complex oxide F (Pt supporting quantity: 0.65 g, and Rh supporting quantity: 0.40 g), and 55 g of $Al_2O_3$ per liter of monolithic carriers.

Example 5

Inside Layer

Powder of cerium complex oxide A and powder of $Al_2O_3$ were mixed and pulverized in the ball mill. Distilled water was added thereto to prepare the slurry. The slurry was allowed to adhere to inner surfaces of the cells of the monolithic carriers. After having been dried, they were baked at 600° C. for 3 hours to thereby form the inside layers. It should be noted that the inside layers were formed to establish the proportion of 20 g of cerium complex oxide A and 30 g of $Al_2O_3$ per liter of monolithic carrier.

Outside Layer

First, palladium nitrate solution was impregnated with powder of cerium complex oxide A. After having been dried, this was baked at 600° C. for 3 hours in the electric furnace to prepare the powder of Pd supported cerium complex oxide A.

Then, rhodium nitrate solution was impregnated with powder of zirconium complex oxide D. After having been dried, this was baked at 600° C. for 3 hours in the electric furnace, to prepare powder of Rh supported zirconium complex oxide D.

Then, the powder of Pd supported cerium complex oxide A, the powder of Rh supported zirconium complex oxide D, the powder of $Al_2O_3$ and the powder of $BaSO_4$ were mixed and pulverized in the ball mill. Distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 50 g of Pd supported cerium complex oxide A (Pt supporting quantity: 1.00 g), 30 g of Rh supported zirconium complex oxide D (Rh supporting quantity: 0.65 g), 50 g of $Al_2O_3$ and 15 g of $BaSO_4$ per liter of monolithic carriers.

Comparative Example 1

Inside Layer

Powder of $Al_2O_3$ and powder of cerium-zirconium complex oxide G were mixed and pulverized in the ball mill. Distilled water was added thereto to prepare the slurry. The slurry was allowed to adhere to inner surfaces of the cells of the monolithic carriers. After having been dried, they were baked at 600° C. for 3 hours to thereby form the inside layers. It should be noted that the inside layers were formed to establish the proportion of 50 g of $Al_2O_3$ and 35 g of cerium-zirconium complex oxide G per liter of monolithic carrier. Further, the inside layer was immersed into the palladium nitrate solution. After having been dried, this was baked at 600° C. for 3 hours, so that Pd was impregnated with and supported on the inside layer. The Pd supporting quantity was 0.81 g per liter of monolithic carrier.

Outside Layer

Powder of $Al_2O_3$ and powder of cerium-zirconium complex oxide G were mixed and pulverized in the ball mill. Distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 55 g of $Al_2O_3$ and 50 g of cerium-zirconium complex oxide G per liter of monolithic carrier. Further, the outside layer was immersed into the dinitrodiammine platinum nitrate solution. After having been dried, this was baked at 600° C. for 3 hours. Thereafter, it was immersed into rhodium nitrate solution, and after having been dried, it was baked at 600° C. for 3 hours so that Pt—Rh was impregnated with and supported on the outside layer. The Pt supporting quantity was 1.30 g and the Rh supporting quantity was 1.00 g per liter of monolithic carrier, respectively.

Comparative Example 2

Inside Layer

Powder of $Al_2O_3$ and powder of cerium complex oxide H were mixed and pulverized in the ball mill. Distilled water was added thereto to prepare the slurry. The slurry was allowed to adhere to inner surfaces of the cells of the monolithic carriers. After having been dried, they were baked at 600° C. for 3 hours to thereby form the inside layers. It should be noted that the inside layers were formed to establish the proportion of 60 g of $Al_2O_3$ and 70 g of cerium complex oxide H per liter of monolithic carrier.

Outside Layer

Powder of $Al_2O_3$ was mixed and pulverized in the ball mill, and distilled water was added thereto to prepare the slurry. The slurry was allowed to adhere to inner surfaces of the cells of the monolithic carriers where the inside layers were already formed. After having been dried, they were baked at 600° C. for 3 hours to thereby form the outside layers. It should be noted that the outside layers were formed to establish the proportion of 55 g of $Al_2O_3$ per liter of monolithic carrier. Further, the outside layer was immersed into the dinitrodiammine platinum nitrate solution. After having been dried, this was baked at 600° C. for 3 hours. Thereafter, it was immersed into rhodium nitrate solution, and after having been dried, it was baked at 600° C. for 3 hours so that Pt—Rh was impregnated with and supported on the outside layer. The Pt supporting quantity was 1.30 g and the Rh supporting quantity was 0.80 g per liter of monolithic carrier, respectively.

Comparative Example 3

First, powder of cerium complex oxide H was impregnated with dinitrodiammine platinum nitrate solution. After having been dried, it was baked at 600° C. for 3 hours, so that Pt was supported on the cerium complex oxide H. Further, the Pt supported cerium complex oxide H was impregnated with rhodium nitrate solution. After having been dried, it was baked in the electric furnace at 600° C. for 3 hours to thereby prepare powder of Pt—Rh supported cerium complex oxide H.

Then, the powder of Pt—Rh supported cerium complex oxide H and the powder of $Al_2O_3$ were mixed and pulverized in the ball mill, and distilled water was added thereto to prepare the slurry. The slurry was allowed to adhere to inner surfaces of the cells of the monolithic carriers. After having been dried, they were baked at 600° C. for 3 hours to thereby form the coating layers of a single layer. It should be noted that the coating layers were formed to establish the proportion of 70 g of Pt—Rh supported cerium complex oxide H (Pt supporting quantity: 1.30 g and Rh supporting quantity: 0.40 g) and 120 g of $Al_2O_3$ per liter of monolithic carrier.

1,150° C. Endurance Test

A V type eight cylinder engine of 4,000 cc was loaded on a real automobile and the exhaust gas purifying catalysts of Examples and Comparative Examples were connected to a bank of the engine (4 cylinders). With the cycle shown in FIG. 2 as a single cycle (30 seconds), the endurance test of 1,800 cycles (30 hours in total) was made of the exhaust gas purifying catalysts of Examples and Comparative Examples.

Figure 2:
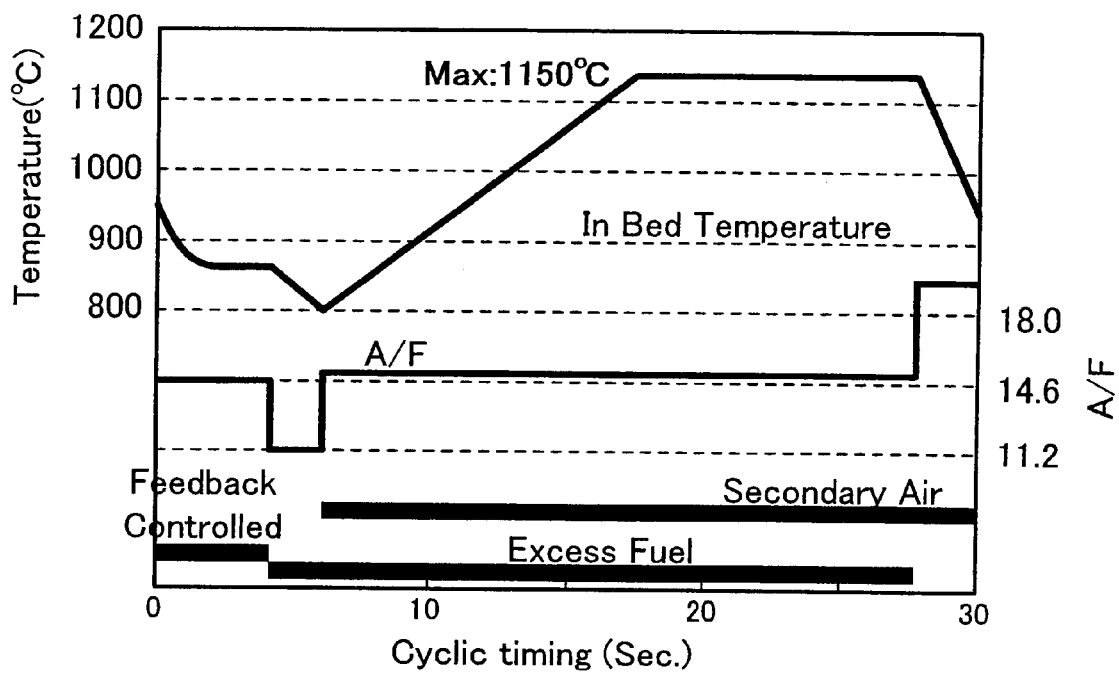
FIG. 2 is a time chart showing a process in one cycle of a 1,150° C. endurance test

One cycle was set as shown in FIG. 2. Specifically, for 0–5 seconds, a mixed gas of gasoline and air which was kept in the stoichimetric state of amount of theoretical combustion air (A/F=14.6) under feedback control was fed to the engine and the internal temperature of the exhaust gas purifying catalysts (catalyst bed) was set to be around 850° C. For 5–7 seconds, the feedback was allowed to open and the fuel was injected excessively, so that the fuel-rich mixed gas (A/F=11.2) was fed to the engine. For 7–28 seconds, while an excessive amount of fuel was kept on being fed to the engine with the feedback open, secondary air was introduced from the outside of the engine through an inlet tube upstream of the catalytic parts, to cause the excessive fuel to react with the secondary air in the interior of the catalyst bed, so as to raise the temperature of catalyst bed. In this time period, the highest temperature was 1,150° C. and the A/F was substantially kept at the amount of theoretical combustion air of 14.8. For the last time period of 28–30 seconds, no fuel was fed but the secondary air was fed to the engine to put the engine into a lean state. The fuel was fed in the condition in which phosphorus compound was added to the gasoline. The total amount was set at 0.41 g in the endurance test by converting the amount of addition to the elements of phosphorous. The temperature of the catalyst bed was measured by thermocouple inserted into a center part of the honeycomb carrier.

Evaluation of A/F Property (80% Purification Window)

First, the catalytic parts of the catalysts undertook the endurance test mentioned above were annealed at 900° C. for 2 hours. Sequentially, the mixed gas was supplied to the engine, while it was varied from its fuel-rich state to its lean state. The exhaust gas produced by the combustion in the engine was purified by use of the exhaust gas purifying catalysts of Examples and Comparative Examples. The CO and NOx purifying rates were measured. A purifying rate obtained when the purifying rates of these components are coincident with each other was defined as a CO—NOx cross-point purifying rate. Also, the range in which the purifying rates of all of CO, NOx and HC are 80% or more was defined as a 80% purification window.

It is to be noted that the measurement of the purifying rates was performed in the condition of the engine only, rather than in the condition in which the engine was mounted on the automobile. The temperature of the exhaust gas supplied to the parts of the catalysts was set at 460° C. and space velocity SV was set at 80,000/h. The results are shown in TABLE 1.

Evaluation of low-temperature property (HC 50% purification temperature) The mixed gas of the stoichiometric state (A/F=14.6±0.2) was supplied to the engine. While the temperature of the exhaust gas exhausted by the combustion of the mixed gas was made to rise at a rate of 30° C. per minute, the exhaust gas was supplied to the catalytic parts of the exhaust gas purifying catalysts of Examples and Comparative Examples. The temperature was measured when HC in the exhaust gas was purified to 50%. The measurement was performed under the condition of the space velocity SV of 80,000/h. The results are shown in TABLE 1.

TABLE 1

| Examples/ Comparative Examples | Composition of Catalyst (Supporting weight (g) per liter of monolithic carrier) | | Catalyst Layer | 80% Purification Window (A/F) | HC 50% Purification Temperature (° C.) |
|---|---|---|---|---|---|
| | Inside Layer | Outside Layer | | | |
| Example 1 | $Ce_{0.5}Zr_{0.45}Y_{0.05}O_{1.97}(35)$ $Al_2O_3(50)$ | Pt-RH(0.65–0.25)/$Ce_{0.6}Zr_{0.45}Y_{0.05})_{1.97}(50)$ $Al_2O_3(55)$ Pt-Rh(0.65–0.75)/$Zr_{0.78}Ce_{0.16}La_{0.02}Nd_{0.04}O_{1.97}(50)$ | Pd | 0.50 | 260 |
| Example 2 | $Ce_{0.5}Zr_{0.45}Y_{0.05}O_{1.97}(40)$ $Al_2O_3(70)$ $BaSO_4(20)$ | Pt(1.00)/$Ce_{0.48}Zr_{0.48}Y_{0.07}O_{1.96}(70)$ Rh(1.00)/$Zr_{0.80}Ce_{0.16}La_{0.04}O_{1.98}(20)$ $Al_2O_3(50)$ | Pt | 0.48 | 270 |
| Example 3 | $Al_2O_3(70)$ | Pt-Rh(1.30–0.30)/$Al_2O_3(65)$ $Ce_{0.60}Zr_{0.32}Y_{0.08}O_{1.96}(80)$ | Rh | 0.48 | 290 |
| Example 4 | $Ce_{0.5}Zr_{0.45}Y_{0.05}O_{1.97}(30)$ $Al_2O_3(30)$ | Pt(0.65)/$Ce_{0.5}Zr_{0.45}Y_{0.05}O_{1.97}(40)$ Pt-Rh/(0.65–0.40)/$Zr_{0.80}Ce_{0.16}La_{0.02}Nd_{0.02}O_{1.97}(40)$ | — | 0.50 | 305 |
| Example 5 | $Ce_{0.5}Zr_{0.45}Y_{0.05}O_{1.97}(20)$ $Al_2O_3(30)$ | Pd(1.00)/$Ce_{0.5}Zr_{0.45}Y_{0.05})_{1.97}(50)$ Rh(0.60)/$Zr_{0.80}Ce_{0.16}La_{0.04}O_{1.98}(30)$ $Al_2O_3(50)$ $BaSO_4(15)$ | — | 0.46 | 290 |
| Comparative Example 1 | Pd(0.81) supported by impregnation $Al_2O_3(50)$ $Ce_{0.5}Zr_{0.5}O_2(35)$ | Pt-Rh (1.30–1.00) supported by impregnation $Al_2O_3(55)$ $Ce_{0.5}Zr_{0.5}O_2(50)$ | — | 0.21 | 320 |
| Comparative Example 2 | $Al_2O_3(60)$ $Ce_{0.8}Zr_{0.2}O_2(70)$ | Pt-Rh (1.30–0.80) supported by impregnation $Al_2O_3(55)$ | — | 0.20 | 340 |
| Comparative Example 3 | PtRh(1.30–0.40)/$Ce_{0.8}Zr_{0.2}O_2(70)$ $Al_2O_3$ (120) | | — | 0.30 | 330 |

While the illustrative examples of the present invention are provided in the above description, such is for illustrative purpose only and it is not to be construed restrictively. Modification and variation of the present invention that will be obvious to those skilled in the art is to be covered in the following claims.

What is claimed is:

1. An exhaust gas purifying catalyst comprising:
    a coating layer supported on catalyst carrier, the coating layer comprising an outside layer formed on a front side thereof and an inside layer formed on an inner side of the outside layer,
    the outside layer comprising a noble metal previously supported on a heat-resisting oxide and a cerium complex oxide,
    the inside layer comprising a heat-resisting oxide on which no noble metal is supported, and
    wherein a catalyst layer comprising a noble metal is further formed on the coating layer at an exhaust gas inflow side of the catalyst carrier.

2. The exhaust gas purifying catalyst according to claim 1, wherein the heat-resisting oxide supporting the noble metal thereon in the outside layer comprises at least one material selected from the group consisting of cerium complex oxide, zirconium complex oxide and alumina, and wherein the heat-resisting oxide of the inside layer comprises at least one material selected from the group consisting of cerium complex oxide, zirconium complex oxide and alumina.

3. The exhaust gas purifying catalyst according to claim 2, wherein the cerium complex oxide comprises cerium and zirconium in the proportion of a cerium content being more than a zirconium content, and wherein the zirconium complex oxide comprises zirconium and cerium in the proportion of a zirconium content being more than a cerium content.

4. The exhaust gas purifying catalyst according to claim 2, wherein the cerium complex oxide is the heat-resisting oxide expressed by the general formula (1) given below:

$$Ce_{1-(x+y)}Zr_xM_yO_{2-z} \quad (1)$$

wherein M represents alkali earth metal or rare earth metal, z represents oxygen vacancy, x represents a proportion of atom of 0.20–0.70, y represents a proportion of atom of 0–0.20, and 1–(x+y) represents a proportion of atom of 0.10–0.80, and wherein the zirconium complex oxide is the heat-resisting oxide expressed by the general formula (2) given below:

$$Zr_{1-(a+b)}Ce_aN_bO_{2-c} \quad (2)$$

wherein N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90.

5. The exhaust gas purifying catalyst according to claim 4, wherein the alkali earth metal represented by M in the general formula (1) and the alkali earth metal represented by N in the general formula (2) comprises at least one material selected from the group consisting of Mg, Ca, Sr and Ba, and wherein the rare earth metal represented by M in the general formula (1) and the rare earth metal represented by N in the general formula (2) comprises at least one material selected from the group consisting of Y, Sc, La, Pr and Nd.

6. The exhaust gas purifying catalyst according to claim 1, wherein the noble metal comprises at least one material selected from the group consisting of Pt, Rh and Pd.

7. The exhaust gas purifying catalyst according to claim 1, wherein the outside layer and/or the inside layer further comprises hydrosulfate, carbonate, nitrate and/or acetate of Ba, Ca, Sc, Mg and La.

8. The exhaust gas purifying catalyst according to claim 1, wherein both of the outside layer and the inside layer comprise alumina.

9. The exhaust gas purifying catalyst according to claim 1, wherein the noble metal of the catalyst layer comprises at least one material selected from the group consisting of Pt, Rh and Pd.

* * * * *